(12) United States Patent
Radau

(10) Patent No.: US 7,181,976 B2
(45) Date of Patent: Feb. 27, 2007

(54) SPRING-ELASTIC MEASURING ELEMENT COMPRISING A FLAT CONNECTING ELEMENT THAT CAN BE WELDED

(75) Inventor: Otto Radau, Kamp-Lintfort (DE)

(73) Assignee: Armaturenbau GmbH, Wesel (DE)

( * ) Notice: Subject to any disclaimer, the term of this patent is extended or adjusted under 35 U.S.C. 154(b) by 0 days.

(21) Appl. No.: 10/549,556

(22) PCT Filed: Mar. 12, 2004

(86) PCT No.: PCT/DE2004/000512

§ 371 (c)(1),
(2), (4) Date: Sep. 19, 2005

(87) PCT Pub. No.: WO2004/085983

PCT Pub. Date: Oct. 7, 2004

(65) Prior Publication Data

US 2006/0191348 A1    Aug. 31, 2006

(30) Foreign Application Priority Data

Mar. 27, 2003   (DE) .............................. 103 13 986

(51) Int. Cl.
*G01L 7/04* (2006.01)
(52) U.S. Cl. ...................................................... 73/732
(58) Field of Classification Search ........... 73/700–756
See application file for complete search history.

(56) References Cited

U.S. PATENT DOCUMENTS 2,299,542 A    10/1942  Hedfield 3,926,055 A * 12/1975 Garnett ......................... 73/720
4,615,219 A   10/1986  Ache
6,164,138 A *  12/2000 Blake et al. .................. 73/732
6,485,846 B1* 11/2002 Zheleznyakov et al. .... 428/671
6,684,712 B2*  2/2004 Klein et al. ................... 73/732

FOREIGN PATENT DOCUMENTS

| DE | 142 208 C | 4/1902 |
| DE | 733 480 C | 2/1943 |

* cited by examiner

*Primary Examiner*—Edward Lefkowitz
*Assistant Examiner*—Jermaine Jenkins
(74) *Attorney, Agent, or Firm*—Collard & Roe, P.C.

(57) ABSTRACT

The invention relates to a spring-elastic measuring element (1) for thermometers, pressure switches or manometers consisting of an arc-shaped measuring tube (3), a base body (2) and a connecting element (10) for the measuring mechanism. The aim of the invention is to achieve the fully automated welding of the thermally influenced zone and to improve the latter. To achieve this, the connections between the measuring tube (3) and the base body (2) and the measuring tube and the connecting element (10) are obtained using connecting elements (11, 12) that can be welded. This allows the risk of contamination of the measuring system to be eliminated to a great extent and reduces the formation of corrosion and vibration cracks by the use of a small thermally influenced zone. A connecting element (11, 12) can also be produced as one-piece with the measuring tube (3) by expanding or creating a bead on the latter. The welded joint can be achieved by laser welding or electron-beam welding and the invention permits the welding of chrome-nickel steel to bronze.

10 Claims, 2 Drawing Sheets

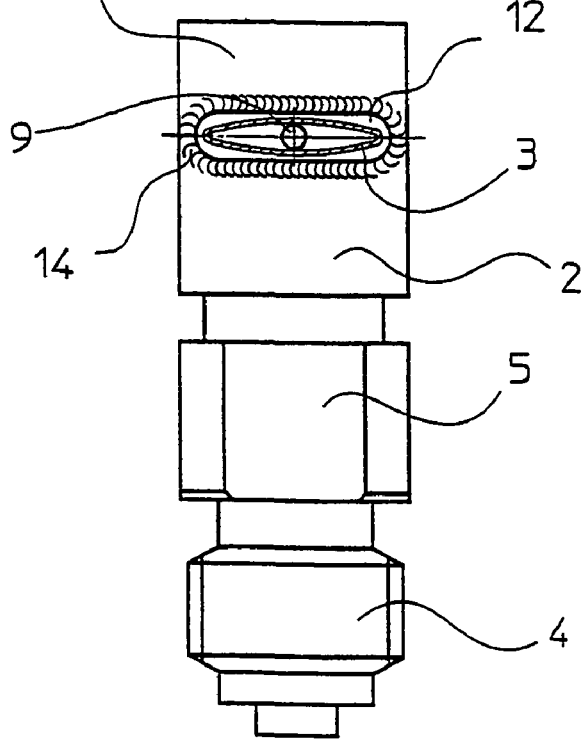
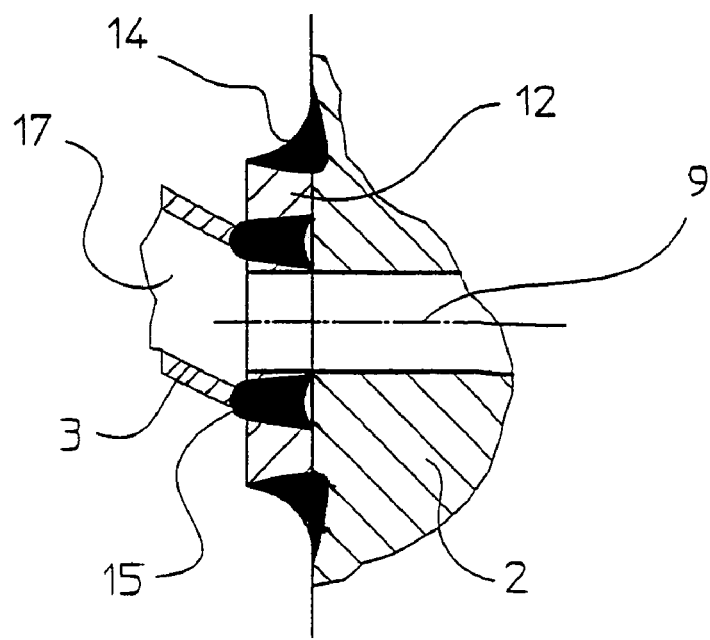

SPRING-ELASTIC MEASURING ELEMENT COMPRISING A FLAT CONNECTING ELEMENT THAT CAN BE WELDED

CROSS REFERENCE TO RELATED APPLICATIONS

Applicant claims priority under 35 U.S.C. §119 of German Application No. 103 13 986.9 filed Mar. 27, 2003. Applicant also claims priority under 35 U.S.C. §365 of PCT/DE2004/000512 filed Mar. 12, 2004. The international application under PCT article 21(2) was not published in English.

The invention relates to a spring-elastic measuring element in particular for thermometers, pressure switches or manometers, comprising an arc- or screw-shaped measuring tube, which is connected with and particularly welded to a base body at one end, and to a connecting leg for joining it with the measuring mechanism at the other end.

For measuring instruments that are sensitive to pressure or temperature, an elastic spring element consisting of a thin-walled material is used that may deform as a result of the pressure acting on it. As a rule, in this conjunction, the measuring element has the shape of an arc, and is connected with one end to a stable base body, and with another end with the measuring mechanism via a thrust rod, so that the occurring deformation exerts minor force on the measuring mechanism via the thrust rod, and the force of thrust so generated is consequently translated into a rotational movement that is transmitted to an indicator element via the measuring mechanism. In this connection, the base body supports both the measuring mechanism and the spring-elastic measuring element, so that the base body has to be designed with dimensional stability vis-à-vis the actual measuring element. For example, the base body is screwed to a pressure feed line via a provided thread connection, and consequently needs to be designed with adequate dimensions and rigidity to resist distortion versus deformation. The actual measuring mechanism is secured in this connection on a side or head surface of the base body, and the tension generated on the measuring element at the end side is transmitted to the measuring mechanism via a thrust rod. At the other end, the measuring element is connected with the feed channel of the pressure connection, so that the pressure medium is received in the spring-elastic measuring element. The latter can be connected in this conjunction with the feed channel either directly or via a piece of tube.

Owing to the fact that the base body is designed relatively compact, and that the measuring element is a thin-walled round or oval tube, it is necessary to produce a gas-tight, welded transition. It is possible in this connection to make provision, for example for a slot milled into the base body that has a direct connection to the channel of the pressure medium, and which is then welded to the measuring element after the latter has been inserted. Such an embodiment is characterized by large gaps and cavities between the base body and the measuring spring, and therefore suitable only for manual welding. Another design variation consists in that a component for receiving the spring in the base body is provided with two milled welding edges, so that slim, thin bridges remain in the base body, which then can be welded to the measuring element. Such a design variation facilitates manual welding, however, it is only conditionally suitable for mechanical welding because the thin-walled measuring element is frequently damaged as a result of the large amount of heat being admitted. Another known design variation is based on a measuring element that is slid over the sheet metal cap and welded to the latter, whereby the sheet metal cap is welded to the base body first. Since measuring springs for different measuring ranges have different dimensions, it is not possible in this connection to avoid larger gaps, which prevents flawless tightness to gas and mechanical welding without feeding welding wire. Furthermore, it has been found that as a result of the high admission of heat for welding the measuring element to the base body, the resulting oxide layers penetrate the zone of the welding seams and up into the measuring system, causing a change in the structure in the zone influenced by such heat due to the not insignificant admission of heat, which in turn is adversely influencing the strength and resistance to corrosion of the spring-elastic measuring element. Moreover, the formation of pores and hot fissures as well as of material segregation are observed in connection with the known welding methods, which may lead to basic cells of fissuring caused by corrosion and vibration. To the extent to which welding has to be carried out by hand, such welding work can be carried out only by experienced welders skilled in manual welding because the material thickness values vary. Such welders have to possess a certain vocational experience and, as a rule, cannot be replaced by other colleagues, so that any variations due to sick leave or vacation time cause significant impairment.

Therefore, the present invention is based on the problem of providing a spring-elastic measuring element as well as a method for producing such a measuring element, in connection with which only minor transfer of heat is required and fully automated welding is feasible, if need be.

For resolving said problem, provision is made according to the invention that the connection between the measuring tube and the base body and/or connecting element is indirectly established by means of a weldable connecting element. Further advantageous embodiments are specified in the dependent claims.

By employing a weldable connecting element between the measuring tube and the base body, on the one hand, and the measuring tube and the connecting leg on the other, the specific properties of the materials used and their wall thickness values can be taken into account in a substantially superior manner than it has been possible heretofore according to conventionally applied methods. In this conjunction, the connecting elements are adapted to the geometry of the measuring element, specifically so with respect to their dimensions and also to their given wall thickness values, to an extent such that approximately identical wall thickness values are obtained, and that a substantially more favorable welding joint can be produced in terms of welding technology due to the thermal influence acting on said elements, without allowing said components to be connected to deform. Furthermore, no substantial layers of oxide are produced on the welding seams, so that any formation of oxide in the measuring system is consequently reduced as well. Moreover, owing to the minor influence of heat within the zone of the welding seam, only minor structural changes occur in the zone influenced by heat, and no scaling and overheating of the melt bath will occur, so that the formation of pores and fissures caused by heat is avoided. In particular, no material segregation occurs, which could otherwise become the nucleus of fissures caused by corrosion and vibration. Notching caused by heat penetrating the welding seam transitions, or gaps conditioned by the construction of the assembled components are avoided as well. Furthermore, also contamination of the measuring system by brushes, radiation or separation grinding can be beneficially avoided. Moreover, the selected welding methods are advantageous in that very high welding rates are achieved, such welding rates being higher than the heat conduction of the material to be joined by welding. This has effects on the solidification characteristic in the material. The solidification behavior that is typical of short-time metallurgy permits clear suppression of any separation of intermetallic phases during the welding process for joining types of alloy that are alien to one another such as copper and steel, and consequently to obtain superior mechanical-technological properties. This means that it is now possible also to weld together material combinations (CrNi steel and bronze) which heretofore could be joined only by means of soldering methods.

The welding seam can be produced in this connection in a fully automated way in a particularly advantageous manner by means of a welding robot with the use of a connecting element, so that it is possible to maintain a constant high-quality standard. Furthermore, a substantially higher production rate can be achieved due to such mechanical manufacture.

In a first embodiment, the connecting element is designed in this connection in the form of a flat- and thin-walled single component that can be connected both with the measuring tube, on the one side, and the connecting leg on the other, whereby in a further developed embodiment of the invention, a first welding seam is placed between the connecting element and the measuring tube, such first welding seam extending through the connecting element and up the face area of the measuring tube. A second welding seam is subsequently produced between the connecting element and the base body or the connecting leg. As an alternative, it is possible to design the connecting element and the measuring tube in the form of one single piece, and to produce it by widening and flanging the measuring tube. With such a design variation, it is assured, first of all, that the wall thickness values are the same, and, furthermore, depending on the geometry of the measuring tube, the use of another single component can be omitted to the extent such widening and flanging of the measuring tube is feasible. Subsequently, the widened and flanged measuring tube can be joined with the base body or connecting leg by means of a welding seam.

In connection with both design variations, provision is particularly made that the connecting element is adapted to the cross section of the measuring tube to such an extent that a protruding edge is formed, extending at least over part of, but preferably over the full circumference. Such an edge serves for welding the measuring tube to the base body or further connecting component if the connecting element has been previously welded to the measuring tube. The connection between the connecting element and the measuring tube is preferably produced by one single welding seam, for example by a laser or electron beam weld, whereas the marginal zone is joined with the base body or connecting leg by means of a second welding seam. To this extent, two welding seams extending separated from one another in terms of space are produced in the embodiment with one single connecting element, which lead to extremely low introduction of heat for the individual welding operations, and assure obtaining the advantages already stated above for the spring-elastic measuring element as defined by the invention. Therefore, the connecting element must not necessarily consist of the same material as the base body, but it is possible to use, for example an additive welding material or some other material, so that the welding structure can be influenced additionally. The welding seams are preferably produced by laser or electron beam welding, which permits at the same time a fully automated production with constant high quality.

Therefore, owing to the simple fixation and mounting of the components, and particularly by virtue of the simple geometry and tolerance accuracy of such components, it is possible to employ a fully automated, preferably mechanical welding process. The application of laser or electron beam welding permits careful welding with low introduction of heat in the zone of thermal influence, and is especially favorable, whereby the aforementioned benefits are realized for the metal structure of the measuring tube, which in turn favors the measuring properties and the useful life expectancy of the measuring tube. Furthermore, enhanced resistance to corrosion of the measuring tube and the welding seams is achieved, so that the service life the spring-elastic measuring element is improved.

For resolving the process problem for producing a connection between a measuring tube and a base body and/or connecting leg, a welded joint is proposed that makes provision for a weldable connecting element, which is formed by widening and flanging the measuring tube, or joined as a single component with the measuring tube by a welding seam, whereby the welding seam is placed extending through the connecting element up to the face areas of the measuring tube, and whereby the protruding marginal area of the connecting element is joined with the base body and/or connecting leg by means of a second welding seam. The proposed method is suited in a particularly advantageous manner for the fully automated welding of the spring-elastic components of the measuring element, so that a constant quality is achievable, on the one hand, and rational manufacturing feasibility is available on the other. To the extent a connection element is used as a single component, the required welding seam may extend separated from one another in terms of space, whereas with the embodiment comprising widening and flanging of the measuring tube, only one single welding seam is required for producing the welding joint with the base body and/or connecting leg. The welding seam can be produced by laser or electron beam welding.

The special advantage of the method as defined by the invention lies in that as a consequence of the low wall thickness, which is preferably adapted to the wall thickness of the measuring tube, only minor heat transfer is required for producing a welded joint. Distortion of the workpiece, particularly of the measuring tube, can be excluded to that extent, and owing to the low admission of heat, contamination by oxide layers within the measuring tube can be excluded as well. Such low admission of heat is particularly beneficial in view of any formation of defective spots or pores, so that nuclei of fissuring caused by corrosion and vibration are avoided, and the useful life of the manufactured spring-elastic measuring element is therefore significantly prolonged. Owing to the quality enhancement so obtained, combined with a rational production, substantial benefits are thus obtained vis-a-vis productions methods employed heretofore.

The invention is explained in greater detail in the following with the help of the figures, in which:

FIG. 2 is a side view of the base body with the connected measuring tube.

FIG. 3 is a sectional and enlarged side view of the connection between the connecting element and the measuring tube, on the one hand, and the base body on the other.

Figure 1:
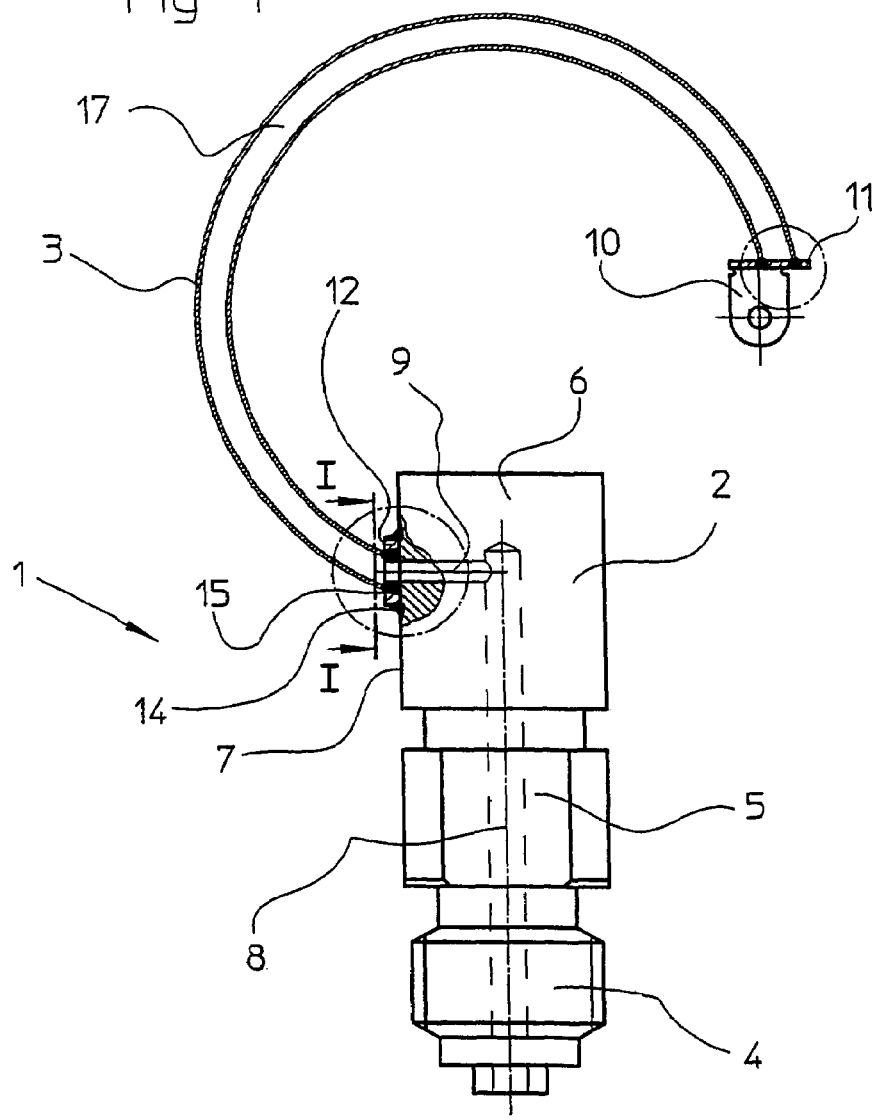
FIG. 1 is a side view of a spring-elastic measuring element with a sectioned measuring tube.

FIG. 1 shows a spring-elastic measuring element 1 as defined by the invention, comprising a base body 2, a measuring tube 3, as well as a measuring element not shown. The base body 2 consists of a four-edged body with a thread connection 4 formed on one side, a center part 4, and a head part 6 having at least one plane surface 7. In the exemplified embodiment shown, the base body has a square cross section. Provision is made for a longitudinal bore 8 extending in the axial direction of the base body 2 up into the head part 6, said longitudinal bore feeding into the plane surface 7 via a transverse bore 9.

The measuring tube 3 has the shape of an arc and is connected with one end to the base body 2, and joined with its other end with connecting leg 10. A first connecting element 11 is arranged between the connecting leg 10 and the measuring tube 3, and a second connecting element 12 is arranged between the base body 2 and the measuring tube 3, said connecting elements having approximately the same wall thickness as the measuring tube 3. The thin-walled connecting elements 11, 12, which are first welded only to the measuring tube 3, are used in order to reduce the heat transfer, with only minor influence exerted on the thermally influenced zone. As shown in greater detail in FIGS. 3 and 4, the welding is preferably carried out extending through the connecting elements 12 and 11, respectively, connecting the weld with the face area of the measuring tube 3. Subsequently, the measuring tube 3 is fixed vis-à-vis the base body 2 with the connecting element 12, so that the protruding edge of the connecting element 12 can be welded to the base body. Therefore, owing to the simple fixation and mounting of the components, and particularly by virtue of the simple geometry and tolerance accuracy of such components, it is possible to apply a fully automated and preferably mechanical laser or electron beam welding method. Due to the application of such laser or electron beam, the careful and minor introduction of heat into the thermally influenced zone is favorably affecting the metal structure of the measuring tube, which in turn has a beneficial impact on the measuring properties and the useful life expectancy of the measuring tube, as well as also on the substantially enhanced resistance of the measuring tube and welding seams 14, 15, 16 to corrosion.

In this connection, a connecting leg 10 is welded to the connecting element 11 before or after the connection has been made with the measuring tube 3, so that the latter can be coupled to the measuring element (not shown) via the connecting leg 10. Thus the medium can be received under pressure in the interior space 17 of the measuring tube via the longitudinal bore 8 and the transverse bore 9, and the pressure so exerted consequently leads to deformation of the arc-shaped measuring tube 3. Slight deformation of the measuring tube causes force to act directly on the measuring mechanism and thus on the indicator mechanism via the thrust rod.

FIG. 2 shows another side view of the base body 2 with the measuring tube 3 cut according to section line I—I.

FIG. 3 is an enlarged sectional part view of the transition from the base body 2 to the measuring tube with the two welding seams 14 and 15. The present enlarged view shows clearly that the two welding seams 14, 15 are produced separated from one another, namely first placed extending through the connecting element 12 up to the face area of the measuring tube 3, and the connecting element 12 is then subsequently joined with the base body 2 by the welding seam 14.

Figure 4:
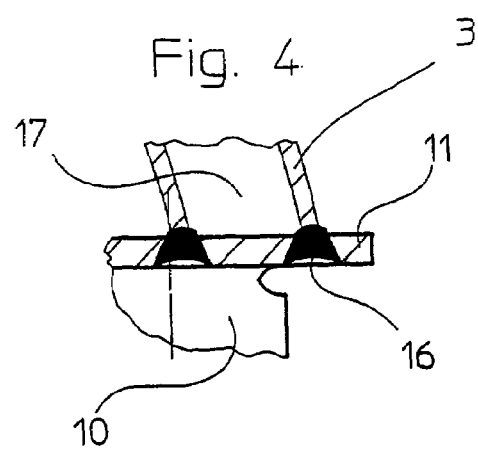
FIG. 4 is a sectional and enlarged side view of the connection of the measuring tube with a connecting leg.

FIG. 4 also shows an enlarged sectional part view of the opposite end of the measuring tube 3 with a connecting element 11, which in turn is joined with the face area of the measuring tube 3 by a welding seam 16 extending through the connecting element 11. The connecting leg 10 is molded onto or welded to the connecting element 11.

LIST OF REFERNCE NUMBERS

1. Spring-elastic measuring element
2. Base body
3. Measuring tube
4. Thread connection
5. Center part
6. Head part
7. Plane surface
8. Longitudinal bore
9. Transverse bore
10. Connecting leg
11. Connecting element
12. Connecting element
13. 14 Welding seam
14. 15 Welding seam
15. 16 Welding seam
16. 17 Interior space

The invention claimed is:

1. A spring-elastic measuring element particularly for thermometers, pressure switches or manometers, comprising an arc- or screw-shaped measuring tube connected, particularly welded at one end to a base body, and at the other end joined with a connecting leg for the measuring mechanism, wherein the connection between the measuring tube and the base body and/or connecting leg is indirectly established by means of a weldable connecting element; and wherein a welding seam is produced between the connecting elements and the measuring tube, extending through the connecting element up to the face area of the measuring tube.

2. The spring-elastic measuring element according to claim 1, wherein the connecting element is a flat and thin-walled single component.

3. The spring-elastic measuring element according to claim 1, wherein the connecting elements and the measuring tube jointly form one single piece, and are producible by widening and flanging of the measuring tube.

4. The spring-elastic measuring element according to claim 1, wherein the connecting elements are adapted to the cross section of the measuring tube to an extent such that a protruding edge is formed, the latter extending at least in part, over the periphery.

5. The spring-elastic measuring element according to claim 1, wherein the connecting element comprises the same material as the base body or of a welding additive material.

6. The spring-elastic measuring element according to claim 1, wherein the welding seams are producible by laser or electron beam welding.

7. A method for producing a connection between a measuring tube and a base body and/or connecting leg, comprising the use of a weldable connecting element formed by widening and flanging of the measuring tube, or joined as an individual component with the measuring tube by a welding seam, for example a laser welding or electron beam welding seam, whereby the welding seam is produced extending through the connecting element up to the face areas of the measuring tube, and whereby the protruding marginal zone of the connecting element is joined with the base body or connecting leg by means of a second welding seam.

8. The method according to claim 7, wherein two welding seams extend separated from one another in terms of space.

9. A spring-elastic measuring element particularly for thermometers, pressure switches or manometers, comprising an arc- or screw-shaped measuring tube connected, particularly welded at one end to a base body, and at the other end joined with a connecting leg for the measuring mechanism, wherein the connection between the measuring tube and the base body and/or connecting leg is indirectly established by means of a weldable connecting element; and wherein the connecting elements are joined in the measuring tube by welding seams, on the one hand, and with the base body or connecting leg by a second welding seam on the other.

10. A spring-elastic measuring element particularly for thermometers, pressure switches or manometers, comprising an arc- or screw-shaped measuring tube connected, particularly welded at one end to a base body, and at the other end joined with a connecting leg for the measuring mechanism, wherein the connection between the measuring tube and the base body and/or connecting leg is indirectly established by means of a weldable connecting element; and wherein two welding seams separated from one another in terms of space are present.

* * * * *